(12) United States Patent
Maria

(10) Patent No.: US 11,172,358 B2
(45) Date of Patent: Nov. 9, 2021

(54) BLOCKCHAIN-BASED FRONT-END ORCHESTRATOR FOR USER PLANE NETWORK FUNCTIONS OF A 5G NETWORK

(71) Applicant: AT&T Mobility II LLC, Atlanta, GA (US)

(72) Inventor: Arturo Maria, Bellevue, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 261 days.

(21) Appl. No.: 16/399,940

(22) Filed: Apr. 30, 2019

(65) Prior Publication Data

US 2020/0351650 A1 Nov. 5, 2020

(51) Int. Cl.
| | |
|---|---|
| *H04W 12/033* | (2021.01) |
| *G06F 16/182* | (2019.01) |
| *H04L 9/32* | (2006.01) |
| *G06F 9/455* | (2018.01) |

(Continued)

(52) U.S. Cl.
CPC ...... *H04W 12/033* (2021.01); *G06F 9/45558* (2013.01); *G06F 16/1824* (2019.01); *H04L 9/0643* (2013.01); *H04L 9/3297* (2013.01); *H04W 12/122* (2021.01); *G06F 2009/45595* (2013.01); *H04L 2209/38* (2013.01)

(58) Field of Classification Search
CPC ............... H04W 12/033; H04W 12/122; G06F 16/1824; G06F 9/45558; G06F 2009/45595; G06F 2009/45587; H04L 9/3297; H04L 9/0643; H04L 2209/38; H04L 9/3239
See application file for complete search history.

(56) References Cited

U.S. PATENT DOCUMENTS

| | | | | |
|---|---|---|---|---|
| 10,333,721 | B2* | 6/2019 | Uhr | H04L 63/0428 |
| 2017/0330179 | A1* | 11/2017 | Song | G06Q 20/065 |
| 2018/0165110 | A1* | 6/2018 | Htay | G06F 8/65 |

(Continued)

OTHER PUBLICATIONS

Roseboro, Roz. "Cloud-Native NFV Architecture for Agile Service Creation & Scaling", White Paper, Heavy Reading for Mellanox Technologies, Jan. 2016, 10 pages.

(Continued)

*Primary Examiner* — Abiy Getachew
(74) *Attorney, Agent, or Firm* — Amin, Turocy & Watson, LLP

(57) ABSTRACT

Containers and container orchestration can be utilized for the creation of an environment that supports virtual network functions (VNFs) representing user plane and/or control plane gateways of 5G networks. Security and/or performance of the 5G network is improved by utilizing blockchain ledgers representing activity associated with the containers. In one aspect, cryptographic blockchain data is appended to a container when the VNF is created and/or modified. The cryptographic blockchain data can create a permanent ledger of activity on the container, which can be utilized to detect malicious attacks and/or unauthorized requests, and/or track activity associated with containers that are utilized to support high performance users and/or services. Further, the cryptographic blockchain data can be utilized for various applications, such as, but not limited to, security, accounting, network performance, governance and risk compliance, etc.

20 Claims, 12 Drawing Sheets

(51) Int. Cl.
*H04L 9/06* (2006.01)
*H04W 12/122* (2021.01)

(56) References Cited

U.S. PATENT DOCUMENTS

2018/0373885 A1* 12/2018 Arad ................... G06F 21/629
2020/0351077 A1* 11/2020 Krishnaswamy ..... G06F 16/137

OTHER PUBLICATIONS

"IBM Blockchain Platform Technical Overview" IBM Blockchain, Feb. 2019, 7 pages.
Taylor, Martin. "The Application of Cloud Native Design Principles to Network Functions Virtualization" Metaswitch Networks, retrieved Mar. 26, 2019, 9 pages.
Dell, et al. "Virtualization and Containerization of the Mobile Network—Key Foundation of a 5G Network" Metaswitch Networks, Feb. 2018, 15 pages.
"Evolving the Mobile Core to Being Cloud Native" Cisco White Paper, 2017, 10 pages.

* cited by examiner

BLOCKCHAIN-BASED FRONT-END ORCHESTRATOR FOR USER PLANE NETWORK FUNCTIONS OF A 5G NETWORK

TECHNICAL FIELD

The subject disclosure relates to wireless communications, e.g., a blockchain-based front-end orchestrator for user plane network functions of a 5G network.

BACKGROUND

As communication networks evolve, the industry is turning to meet the new challenges presented by next generation networks, for example, fifth generation (5G) networks. 5G networks are configured to provide enhanced mobile broadband, for example, ultra high bandwidth (e.g., 20 Gbps), high spectral efficiency (e.g., 3.5× of long term evolution (LTE) networks), ultra dense networks, and/or energy efficiency. Further, 5G networks can provide ultra-reliable (e.g., high reliability greater than 99.999%) and low latency communications (e.g., ultra low latency of −1 msec and/or low network access and synchronization time). Furthermore, 5G networks can facilitate massive machine type communication (e.g., ultra high density ($10^6$/sq km), long battery life (10 years+), high system gain (e.g., better than narrow band-Internet of things (IoT) and/or more efficient than narrow band-IoT). These features lead to a diverse and often contradictory set of requirements that can be realized economically through low footprint cloud-native network functions providing discrete network slices. Virtualization and containerization are therefore essential foundations for the 5G core network architecture.

In fourth generation (4G) long term evolution (LTE) environment, virtual network functions (VNFs) were typically implemented utilizing virtual machines residing in an environment such as OpenStack. In contrast, implementations for the 5G core network architecture utilize containers and a container orchestrator (e.g. Kubernetes) for the creation of an environment that supports the VNFs. As an example, the VNFs can include serving gateways (SGW) and/or packet data network gateways (PGW) for control plane and/or user plane elements of the core network.

The above-described background relating to mobility networks is merely intended to provide a contextual overview of some current issues and is not intended to be exhaustive. Other contextual information may become further apparent upon review of the following detailed description.

DETAILED DESCRIPTION

Figure 1:
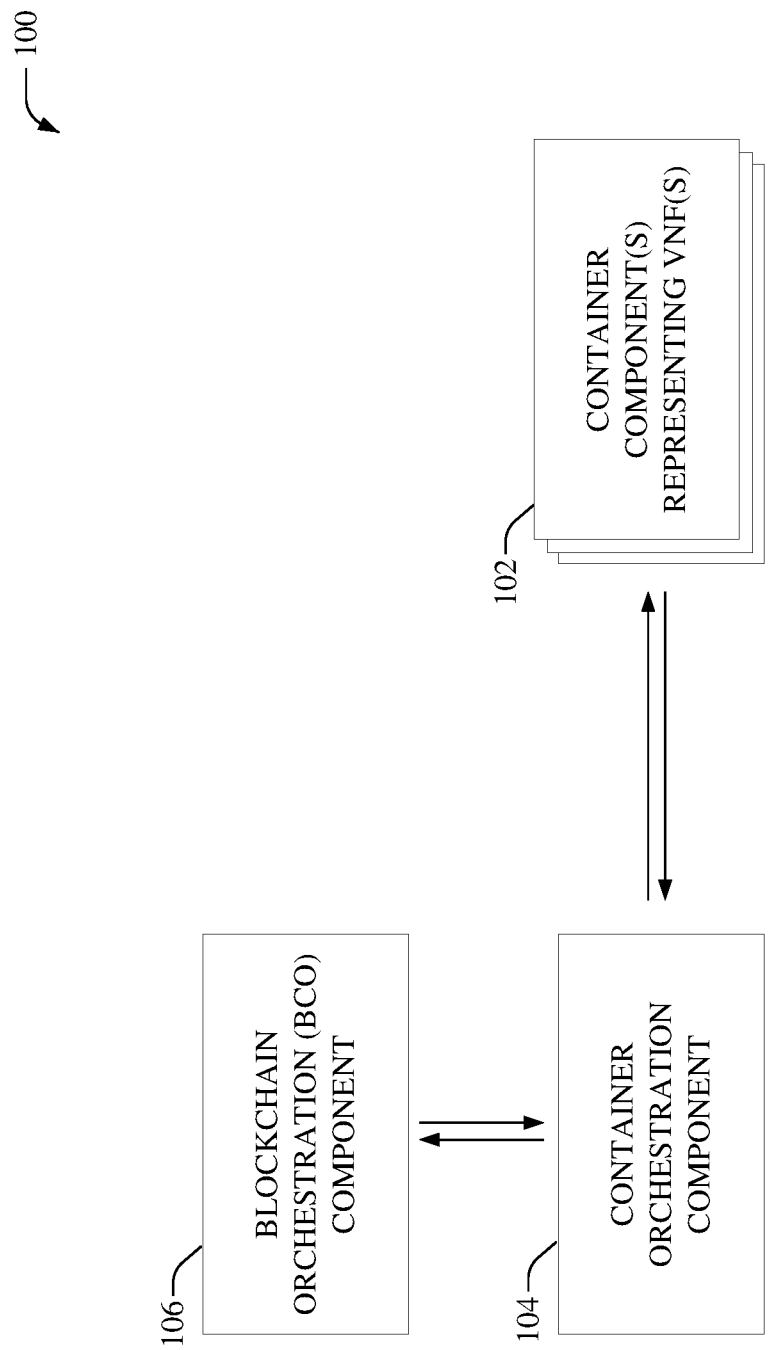
FIG. 1 illustrates an example system that comprises a blockchain front-end element orchestrator.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Terms like "user equipment" or similar terminology, refer to a wired or wireless communication-capable device utilized by a subscriber or user of a wired or wireless communication service to receive or convey data, control, voice, video, sound, gaming, or substantially any data-stream or signaling-stream. Data and signaling streams can be packetized or frame-based flows. Further, the terms "user," "subscriber," "consumer," "customer," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth.

Furthermore, it is noted that the term "cloud" as used herein can refer to a set of servers, communicatively and/or operatively coupled to each other, that host a set of applications utilized for servicing user requests. In general, the cloud computing resources can communicate with user devices via most any wired and/or wireless communication network to provide access to services that are based in the cloud and not stored locally (e.g., on the user device). A typical cloud computing environment can include multiple layers, aggregated together, that interact with each other to provide resources for end-users.

Aspects or features of the disclosed subject matter can be exploited in substantially any wired or wireless communication technology; e.g., universal mobile telecommunications system (UMTS), Wi-Fi, worldwide interoperability for microwave access (WiMAX), general packet radio service (GPRS), enhanced GPRS, third generation partnership project (3GPP) long term evolution (LTE), fifth generation (5G) or other next generation networks, third generation partnership project 2 (3GPP2) ultra mobile broadband (UMB), high speed packet access (HSPA), Zigbee, or another IEEE 802.XX technology, low power wide area (LPWA) and/or non-3GPP standard based solutions, such as, but not limited to, Ingenu, Sigfox, and/or LoRa, etc. Additionally, substantially all aspects of the disclosed subject matter can be exploited in legacy (e.g., wireline) telecommunication technologies.

To meet the growing demands of next generation services, communication network providers have started adopting cloud-native network architectures. The shift from the cloud-ready to cloud-native (e.g., from utilizing virtual machines to utilizing containers) architectures enables the network to provide unprecedented speed, agility and resilience in service development and management process. Cloud-native is an approach to build and run applications that fully exploit the benefits of the cloud computing model.

It can comprise services architectures, infrastructure-as-code, automation, continuous integration/delivery pipelines, monitoring tools, etc. Applications built and deployed with the cloud-native pattern have at least the following characteristics: (i) cloud-native applications can comprise microservices (e.g., each application is a collection of small services that can be operated independently); (ii) cloud-native applications can be packaged in containers (e.g., a standard unit of software that packages up code and all its dependencies so the application runs quickly and reliably from one computing environment to another) that provide isolation contexts for the microservices; (iii) cloud-native applications can be built and run on a continuous delivery model supporting fast cycles of build, test, deploy, release, and develop. Cloud-native applications can be dynamically managed, often built and run on modern platforms such as, but not limited to, Kubernetes or Pivotal Cloud Foundry (PCF), that offer hardware decoupling critical in terms of deployment automation, scaling and management.

In 5G networks, containers and container orchestration can be utilized for the creation of an environment which supports virtual network functions (VNFs) that represent user plane and/or control plane gateways (e.g., serving gateway (SGW) and/or packet data network gateway (PGW)). Conventional systems do not provide a secure way to create and/or utilize these VNFs. In contrast, systems and methods disclosed herein improve network security by providing authentication during VNF creation. Further, in one aspect, the disclosed systems and methods facilitate generation of a cryptographic blockchain data that can be appended to a container when the VNF is created or modified. The blockchain data can create a permanent ledger of creation and/or activity on the container, which can be utilized to detect malicious attacks and/or unauthorized requests, and/or track activity associated with containers that are utilized to support high performance users and/or services. Moreover, the blockchain data can be utilized for various applications, such as, but not limited to, security, accounting, network performance, governance and risk compliance, etc.

Referring initially to FIG. 1, there illustrated is an example system 100 that comprises a blockchain front-end element orchestrator, according to one or more aspects of the disclosed subject matter. Moreover, system 100 provides an efficient approach to improve network security and/or performance by implementing blockchain-based cryptographic capabilities.

The core network architecture of next generation networks (e.g., 5G networks) is rapidly evolving and network operators are moving to cloud-native network architectures to support the growing demands of the next generation network services. According to an aspect, cloud-native network architectures can utilize container components 102 that are instantiated to implement VNFs that represent user plane and/or control plane elements of the network. A container component 102 (e.g., a container) can comprise a standard unit of software that packages up code and all its dependencies, so an application runs quickly and reliably from one computing environment to another. The container component 102 isolates software from its environment and ensures that it works uniformly despite differences for instance between development and staging. A container image is a lightweight, standalone, executable package of software that includes everything needed to run an application: code, runtime, system tools, system libraries and settings. The container image become a container component 102 at runtime (e.g., Docker container images become containers when they run on a Docker Engine).

Containers and virtual machines (VMs) have similar resource isolation and allocation benefits, but function differently. For example, containers virtualize the operating system instead of hardware and are more portable and efficient than VMs. Moreover, multiple containers can run on the same machine and share the host operating system (OS) kernel with other containers, each running as isolated processes in user space. Typically, containers take up less space than VMs, can handle more applications and require fewer VMs and operating systems.

In one aspect, a container orchestration component 104 can be utilized for automating deployment, scaling, management, and networking/availability of containerized applications associated with the container components 102. As an example, the container orchestration component 104 can comprise a set of independent, composable control processes that continuously drive a current state of the containers towards the provided desired state. In one example, the container orchestration component 104 can employ orchestrators, such as, but not limited to Kubernetes, Docker Swarm, Mesos, etc. The container orchestration component 104 provides an easy approach to deploy and operate applications based on a microservice architecture by creating an abstraction layer on top of a group of hosts, so that development teams can deploy their applications and let the container orchestration component 104 manage features, such as, but not limited to controlling resource consumption by an application, application load-balancing across a host infrastructure; load balancing requests across the different instances of an application; monitoring resource consumption and/or resource limits to prohibit applications from consuming too many resources and restarting the applications again; moving an application instance from one host to another if there is a shortage of resources in a host, or if the host dies; leveraging additional resources made available when a new host is added to the cluster, etc.

In 5G networks, container components 102 and container orchestration component 104 can be utilized to create and support containers associated with core network elements. As an example, the network elements comprise but are not limited to SGWs and/or PGWs (e.g., U-SGW and/or U-PGW). According to an embodiment, to improve security related to these network elements, system 100 employs a blockchain orchestration (BCO) component 106 that can logically front-end container components 102 hosting VNFs for U-SGWs and/or U-PGWs. In an aspect, the BCO component 106 can create cryptographic blockchain data (e.g., a permanent ledger of creation and/or activity on the container) that can be appended to the container component 102 when its VNF is created and/or modified. The cryptographic blockchain data can be utilized for tracking activity associated with containers utilized to support high performance users and services and/or to improve network security and/or performance.

Figure 2:
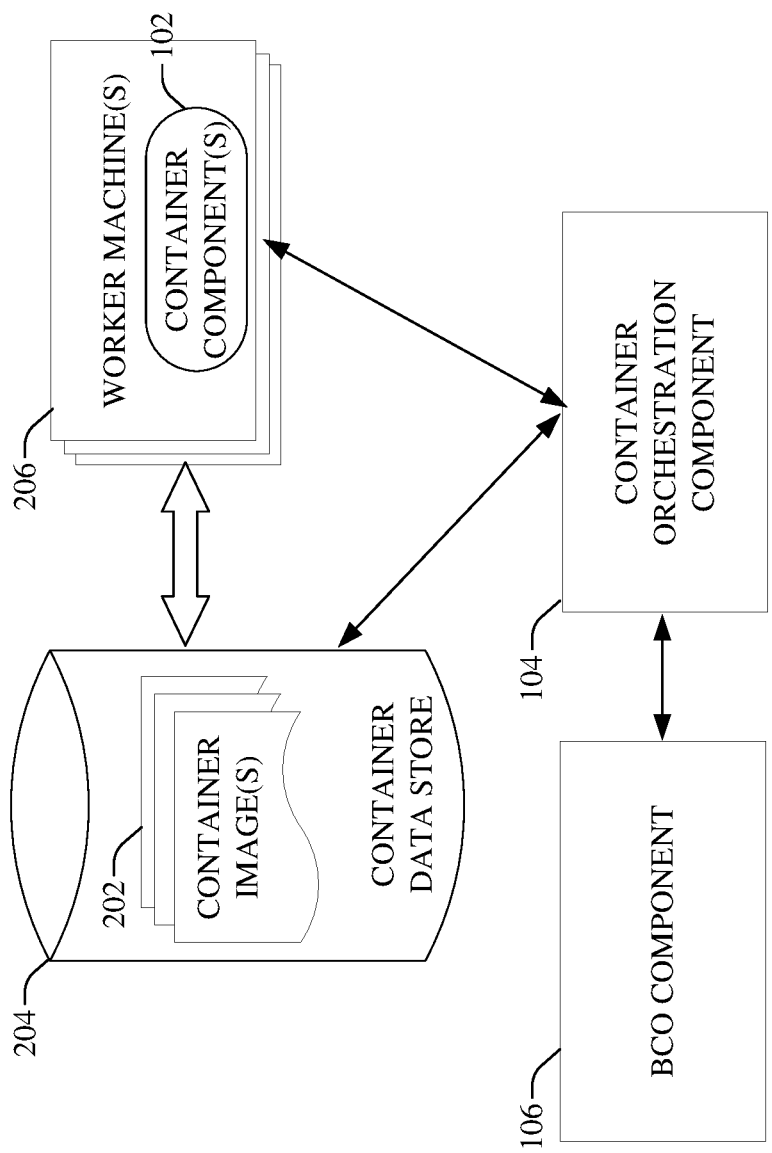
FIG. 2 illustrates an example system that facilitates secure orchestration of containers associated with virtual network functions (VNFs) that represent core network elements.

Referring now to FIG. 2, there illustrated is an example system 200 that facilitates secure orchestration of containers associated with VNFs that represent core network elements, in accordance with an aspect of the subject disclosure. System 200 provides an efficient approach to improve security for control-plane and/or user-plane VNFs by creating a blockchain ledger that provides a historical record of the gateway containers that were created and/or updated. It can be noted that the container component(s) 102, container orchestration component 104, and BCO component 106 can comprise functionality as more fully described herein, for example, as described above with regard to system 100.

Container image(s) 202 can be stored within a network data store, for example, container data store 204. A container image 202 is an unchangeable, static file that includes executable code, so it can run an isolated process on information technology (IT) infrastructure. The container image 202 can be comprised of system libraries, system tools, and other platforms settings a software program needs to run on a containerization platform (e.g., Docker). The container image 202 can share the OS kernel of its host machine (e.g., worker machine 206). In one example, the container image 202 can be compiled from file system layers built onto a parent or base image. These layers encourage reuse of various components, so the developer does not create everything from scratch for every project. As an example, the container images 202 represent VNFs associated with core network user plane entities (e.g., U-SGW and/or U-PGW).

According to an aspect, during runtime, the container orchestration component 104 moves the container images 202 to worker machines 206 to run the container images 202 as container components 102. Traditional systems do not provide any security features that verify whether the container images 202 are original and/or unaltered to avoid creation or distribution of malware. However, system 200 employs the BCO orchestrator to validate the container images 202 and authenticate the requests for executing the container components 102. In one aspect, when the container orchestration component 104 determines that a container image 202 is to be assigned to a worker machine 206, the container orchestration component 104 can send a request to the BCO component 106 to facilitate validation. As an example, the BCO component 106 can exchange (e.g., directly or via the container orchestration component 104) public and private keys with the entity that has requested the creation (and/or update) of the VNF, for example, a container platform, a control plane entity (e.g., mobility management entity (MME)), and/or an end-user equipment. If determined that the request for creation/update of the VNF is not from an authorized entity, the request can be denied and optionally a network operator can be notified. Alternatively, if the BCO component 106 determines that the request for creation/update of the VNF has been received from an authorized entity, the request can be granted.

Further, in one aspect, the BCO component 106 can create a cryptographic block of data (e.g., comprising a blockchain hash value) that can be appended to the container image 202 associated with the VNF. The cryptographic block created is permanent and can be created using the public and private keys provided by the container. As an example, the cryptographic block can comprise information, such as, but not limited to, information indicative of the requestor, a timestamp of creation, a customer identifier (ID) associated with the UE, worker machine ID, etc. Typically, each VNF containerized function can be created in response to network conditions and/or in order to dedicate resources to a particular customer (and/or UE). For example, a high demand customer can be allocated its own U-SGW and U-PGW. The creation (and/or update) of these individual VNF functions would be logged using the cryptographic block. Moreover, the cryptographic block can be utilized for logging data, such as, but not limited to, tracing the history of a container, which user created the container, and/or services that were performed. In one embodiment the cryptographic block can be utilized for verifying that the container images 202 are original and/or have not been altered by unauthorized entities.

Figure 3:
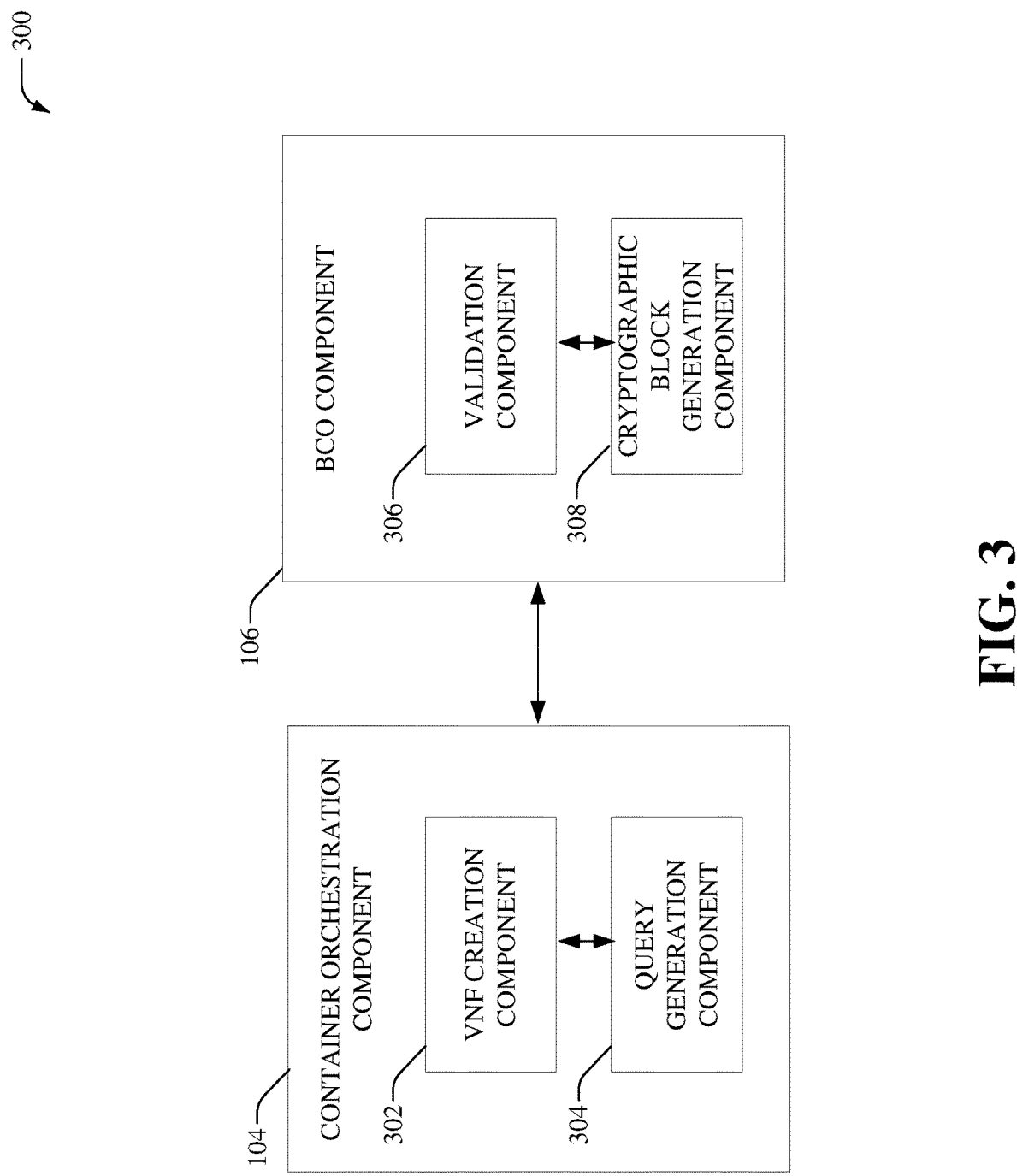
FIG. 3 illustrates an example system that generates a permanent ledger that tracks creation and/or activity on a container.

Referring now to FIG. 3, there illustrated is an example system 300 that generates a permanent ledger that tracks creation and/or activity on a container, in accordance with an aspect of the subject disclosure. It can be noted that the container orchestration component 104 and BCO component 106 can comprise functionality as more fully described herein, for example, as described above with regard to systems 100-200. In this embodiment, system 300 can be utilized in cloud technology that is based on network functions virtualization (NFV) and/or software-defined networking (SDN). NFV can virtualize network services that have been conventionally carried out by proprietary, dedicated hardware/software and instead host the network services in one or more containers (e.g., container component 102). Using NFV, network service providers do not need to purchase proprietary/dedicated hardware devices to enable a service. NFV can improve scalability and flexibility and network capacity can easily be adjusted through software, resulting in reduced capital expenses and/or operating expenses. NFV and SDN are different technologies but complementary. SDN architectures decouple or disassociate network control (e.g., control plane) and forwarding (e.g., data plane) functions. This allows for dynamic, programmable, and/or scalable computing and storage. The SDN architecture can be at least (i) directly programmable; (ii) agile; (iii) centrally managed; (iv) programmatically configured; and/or (v) open standards-based and vendor-neutral. The modular architecture of NFV comprises VNFs that are software-based applications that provide one or more network services. VNFs use the virtualized infrastructure provided by the NFV infrastructure to connect into the network and provide programmable, scalable network services. The VNFs can be executed via one or more containers that can be managed via the container orchestration component 104.

In an aspect, a VNF creation component 302 can determine that a request for instantiating (and/or modifying) a VNF (e.g., representing a user-plane SGW and/or PGW) has been received from a requestor entity (e.g., control plane device, MME, UE, etc.). In response to detecting the request and prior to moving a container image associated with the VNF to a worker machine, a query generation component 304 can generate a query and transmit the query to the BCO component 106. As an example, the query can comprise the request and/or information relating to the request and/or requestor entity. In an aspect, a validation component 306 can verify that the request for instantiating (and/or modifying) the VNF has been received from an authorized entity. For example, the validation component 306 can authenticate the requestor entity by exchanging public/private keys with the requestor entity (e.g., directly or via the container orchestration component 104). In another example, the validation can be performed based on network-defined policies. If the authentication fails, the validation component 306 can notify the container orchestration component 104, which can then prohibit the instantiation (and/or modification) of the VNF. Alternatively, if the authentication is successful, a cryptographic block generation component 308 can determine a cryptographic block (e.g., a hash value) that provides information associated with the instantiation (and/or modification) of the VNF. As an example, the information can comprise, but is not limited to, timestamp related to creation of the VNF and/or receipt of the request, requestor entity information, subscriber information, previously generated hash values associated with the VNF (e.g., hash values associated with a first request for creating the VNF and any subsequent requests for updating the VNF), etc. The cryptographic block generation component 308 can transfer the cryptographic block to the container orchestration component 104, which can then permanently write the cryptographic block to the container created for the VNF. It is noted that the cryptographic block created is permanent and immutable. In one example, the cryptographic block can be created using the public and private keys provided by the container.

Consider an example scenario, wherein VNFs for a user-plane SGW and PGW are to be created for a subscriber. Typically, VNF containerized functions can be created in response to network conditions and/or in order to dedicate resources to a particular subscriber. For example, a high demand subscriber can be allocated its own U-SGW and U-PGW. In conventional systems, there is no record for this VNF creation, no authorization, and no validation that the container image is correct or valid. Moreover, if a hacker has modified the container images stored in the data store, for example, to add malicious code, malware can be loaded onto the worker machines if it is not detected. To prevent such malicious attacks and provide a record for security, accounting, and/or governance and risk compliance purposes, the container orchestration component 104 can move container images associated with the user-plane SGW and PGW to worker machines only after the request is successfully authenticated by the validation component 306. Further, the cryptographic block generation component 308 can determine a cryptographic block representing the generation of the VNFs and can facilitate permanently appending the cryptographic block to the VNF containers.

Figure 4:
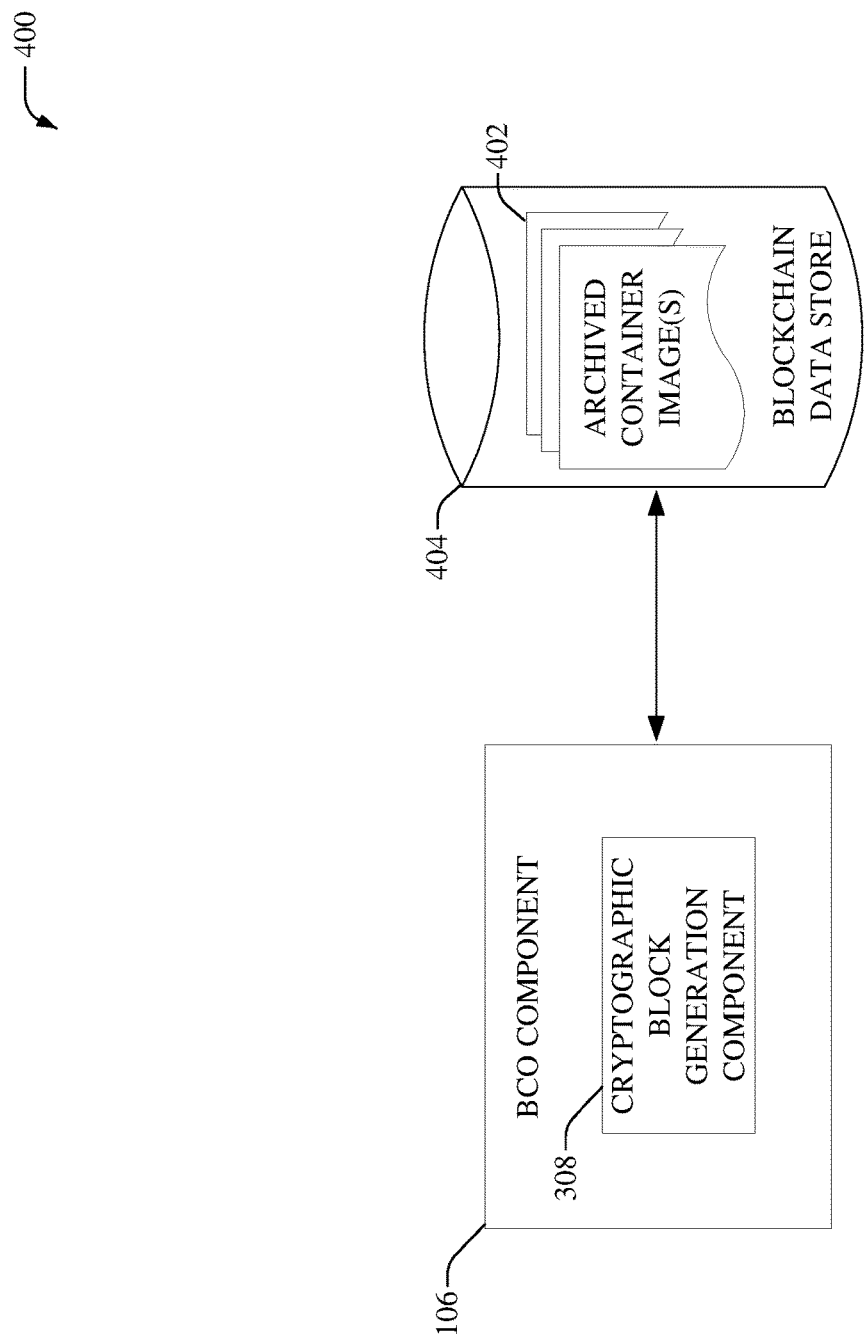
FIG. 4 illustrates an example system that archives blockchain ledgers associated with VNF container activity.

Referring now to FIG. 4, there illustrated is an example system 400 that archives blockchain ledgers associated with VNF container activity, according to an aspect of the subject disclosure. It can be noted that the BCO component 106 and the cryptographic block generation component 308 can comprise functionality as more fully described herein, for example, as described above with regard to systems 100-300. According to an embodiment, when a VNF container is not needed or is changed, the BCO component 106 can permanently store an archived container image 402 of the VNF in a blockchain data store 404. The archived container image 402 comprises the cryptographic block (e.g., generated by cryptographic block generation component 308). Accordingly, both the active container (e.g., container component 102) and the archived container image 402 of the VNF can have a blockchain ledger reflecting the creation and modification of the container. In an aspect, the blockchain data store 404 can store a record of all the VNFs that have been created with a log of data associated with their creation and/or update. This record can be utilized for tracing the history of a container, which user created the container, and/or services that were performed. Further, the record can be utilized for subsequent validation (e.g., of container images), for example, by the validation component 306.

Figure 5:
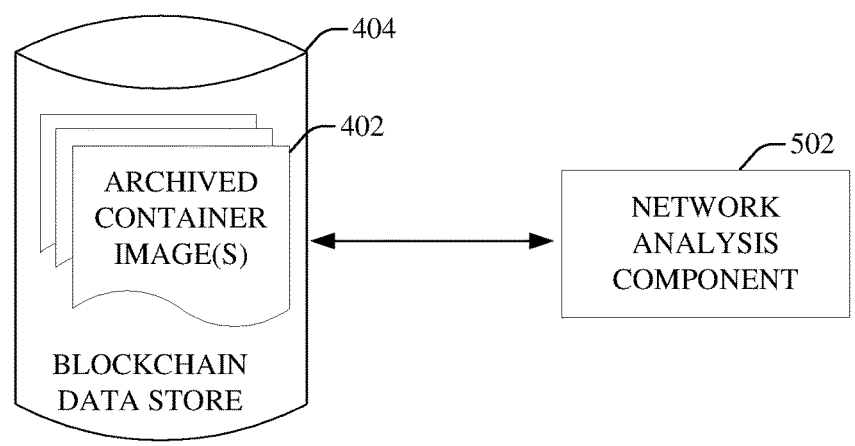
FIG. 5 illustrates an example system that analyzes records associated with activity of VNF containers representing user-plane entities.

FIG. 5 illustrates an example system 500 that analyzes records associated with activity on VNF containers representing user-plane entities, according to an aspect of the subject disclosure. It can be noted that the archived container images 402 and the blockchain data store 404 can comprise functionality as more fully described herein, for example, as described above with regard to systems 400. In one aspect, a network analysis component 502 can scan the images (e.g., periodically, at a defined time, in response to detecting an event, etc.) to improve network security and/or performance. As an example, the network analysis component 502 can analyze the scanned data to determine whether one or more of the container images have been altered and detect unauthorized modifications and/or malicious attacks (e.g., validate container images stored in the data store before moving them to worker machines). In another example, the network analysis component 502 can analyze the scanned data to facilitate diagnosis and/or troubleshooting of detected error conditions. In yet another example, the network analysis component 502 can analyze the scanned data to monetize offers targeted at improving the performance of the network and/or quality of service (QoS) priorities for a particular subscriber. It is noted that the above listed examples are non-limiting and that the archived container images 402 can be utilized for most any application, such as, but not limited to traceability, security, accounting, governance, and risk management and compliance, etc.

Figure 6:
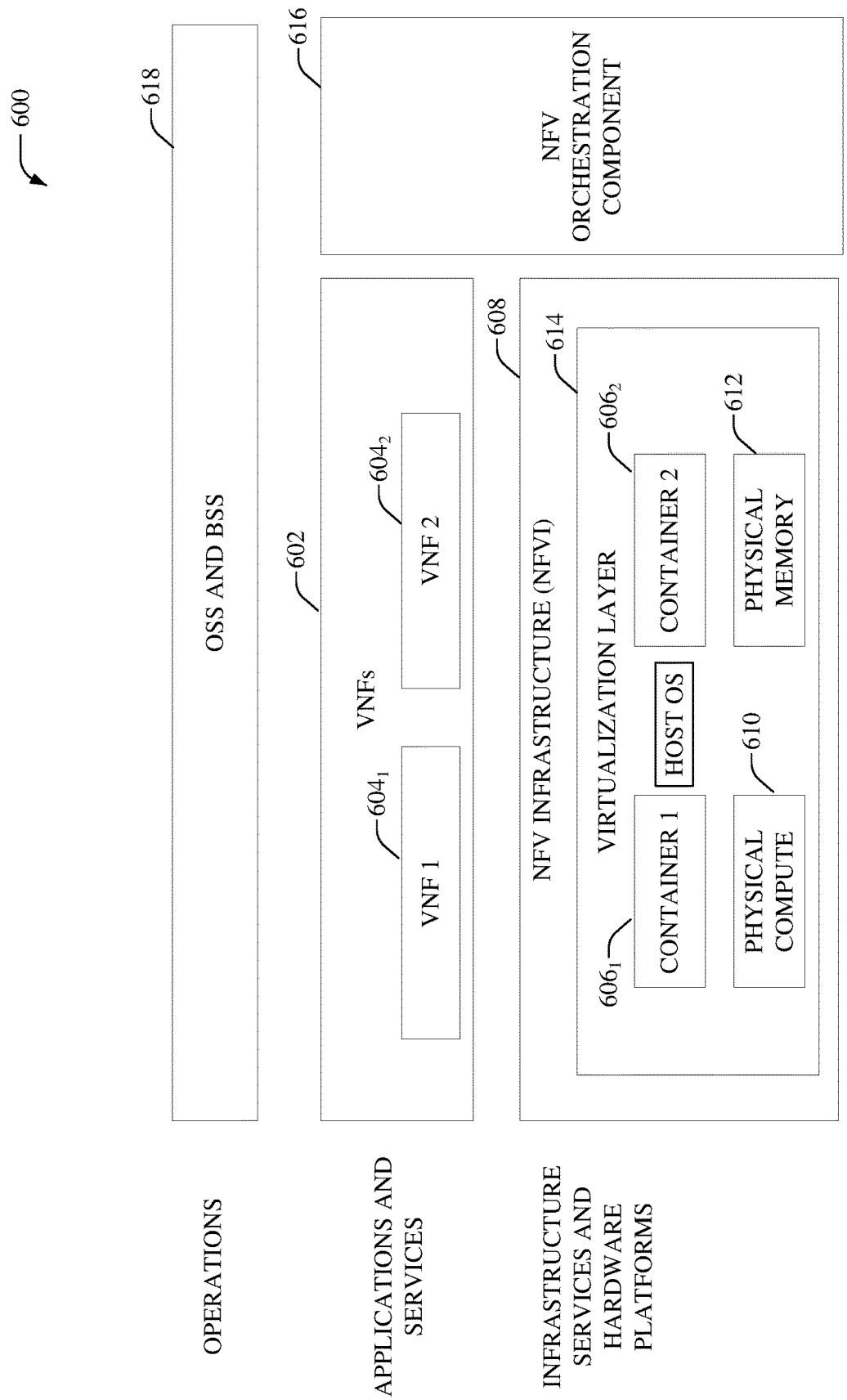
FIG. 6 illustrates an example network functions virtualization (NFV) architecture that supports containers associated with user plane network elements.

Referring now to FIG. 6, there illustrated is an example NFV architecture 600 that supports containers associated with user plane network elements in accordance with the subject embodiments. VNFs 602 are the basic blocks in NFV architecture. VNFs 602 comprise virtualized network elements (e.g., U-SGW, U-PGW, etc.). Additionally or alternatively, various sub-functions of a network element can be implemented as separate VNFs which together function as the virtualized network element. Each VNF runs in a separate container. For example, VNF1 $604_1$ can run in container 1 $606_1$ and VNF2 $604_2$ can run in container 2 $606_2$.

The network function virtualization infrastructure (NFVI) 608 is the environment in which the VNFs are executed. The NFVI 608 can comprise physical resources, for example, physical compute 610 and physical memory 612, on which virtual resources (e.g., utilized by the VNFs) can be instantiated. A virtualization layer 614 can be utilized for abstracting the physical resources into virtual resources. In one aspect, an NFV orchestration component 616 can be utilized to coordinate multiple services through a centralized mediator such as a service consumer or an integration hub. The NFV orchestration component 616 can facilitate generation, maintenance, and/or tear down of network services of the VNFs 602. Further, the NFV orchestration component 616 can facilitate global resource management of NFVI resources. According to an aspect, the NFV orchestration component 616 can comprise the container orchestration component 104 and comprise (and/or be coupled to) the BCO component 106.

An operation support system (OSS) and business support system (BSS) 618 can perform functions, such as, but not limited to, network management, fault management, configuration management, service management, customer management, product management, and/or order management, etc. In an aspect, the OSS and BSS 618 can be integrated with the NFV orchestration component 616 using standard interfaces.

Figure 7:
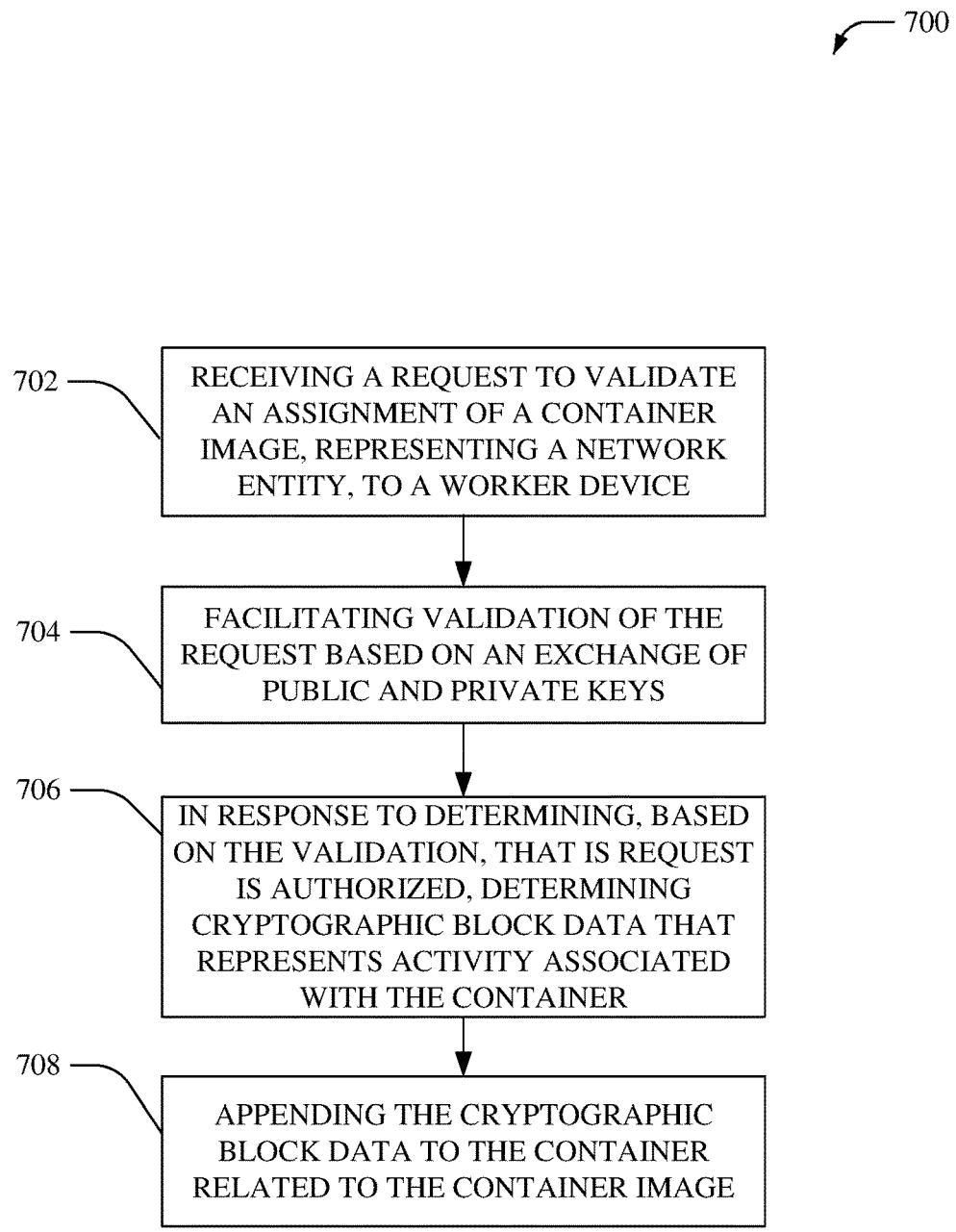
FIG. 7 illustrates an example method that facilitates generating a blockchain ledger that represents activity associated with VNF containers.
Figure 8:
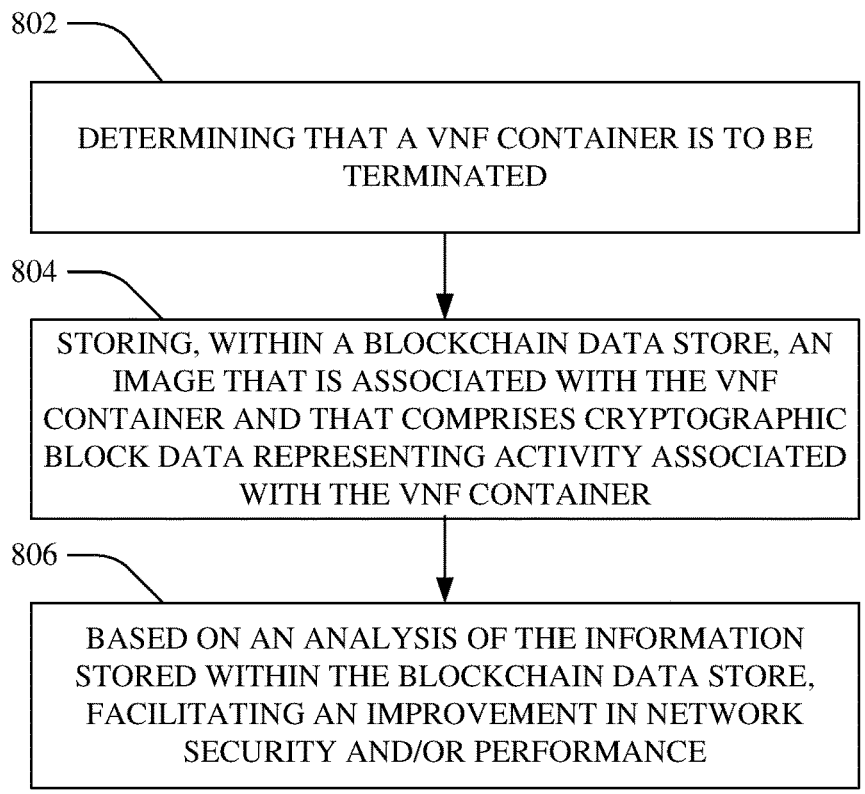
FIG. 8 illustrates an example method for storing activity logs related to VNF containers.

FIGS. 7-8 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 7 there illustrated is an example method 700 that facilitates generating a blockchain ledger that represents activity associated with VNF containers, according to an aspect of the subject disclosure. In an aspect, method 700 can be implemented by one or more network devices of a communication network (e.g., mobility network). Method 700 can provide an efficient approach to tracking activity associated with VNF containers utilized to support high performance users and/or services. As an example, the tracked activity data can be utilized to improve network security and/or performance.

At 702, a request to validate an assignment of a container image, representing a network entity (e.g., user-plane network function), to a worker device can be received. As an example, a container orchestrator can determine creation and/or update of a VNF container and can transmit the request prior to creating/updating the VNF container. At 704, a validation of the request can be facilitated based on an exchange of public and private keys with an entity that has requested the creation and/or update of the VNF, such as, but not limited to, a container platform/product, a control plane device (e.g., MME), a UE, etc. If the validation is unsuccessful (e.g., fails), the request can be denied. Alternatively, at 706, in response to determining, based on the validation, that the request is authorized (e.g., sent by an authorized entity), cryptographic block data that represents activity associated with the container can be determined. As an example, the cryptographic block data comprises a permanent blockchain ledger (e.g., a hash value) indicative of information, such as, but not limited to, information indicative of the requestor, a timestamp of creation, a customer identifier (ID) associated with the UE, worker machine ID, etc. Additionally, for requests that update an existing container, the permanent blockchain ledger can comprise hash values associated with a first request for creating the VNF container and any subsequent requests for updating the VNF container that have been previously received. At 708, the cryptographic block data can be appended to the VNF container. It is noted that the cryptographic block data is immutable and provides activity information that can be utilized to improve network security and/or performance.

FIG. 8 illustrates an example method 800 for storing activity logs related to VNF containers, according to an aspect of the subject disclosure. As an example, method 800 can be implemented one or more network devices of a communication network (e.g., cellular network). At 802, it can be determined that a VNF container (e.g., representing a user-plane function of a core network) is to be terminated. In response to the determining, at 804, an image that is associated with the container and that comprises cryptographic block data representing activity (e.g., creation, modification, etc.) associated with the VNF container can be store, for example, in a blockchain data store. Further, at 806, based on an analysis of the information stored within the blockchain data store, an improvement in network security and/or performance can be facilitated. For example, malicious attacks, unauthorized modifications of container images, addition of malicious code, etc. can be detected based on the analysis.

Aspects and embodiments disclosed herein can be implemented in next generation networks, for example, 5G networks. 5G are configured to provide enhanced mobile broadband, for example, ultra high bandwidth (e.g., 20 Gbps), high spectral efficiency (e.g., 3.5× of LTE), ultra dense networks, and/or energy efficiency. Further, the 5G networks can provide ultra-reliable (e.g., high reliability greater than 99.999%) and low latency communications (e.g., ultra low latency of −1 msec and/or low network access and synchronization time). Furthermore, the 5G networks can facilitate massive machine type communication (e.g., ultra high density ($10^6$/sq km), long battery life (10 years+), high system gain (better than narrow band-IoT and/or more efficient than narrow band-IoT).

Figure 9:
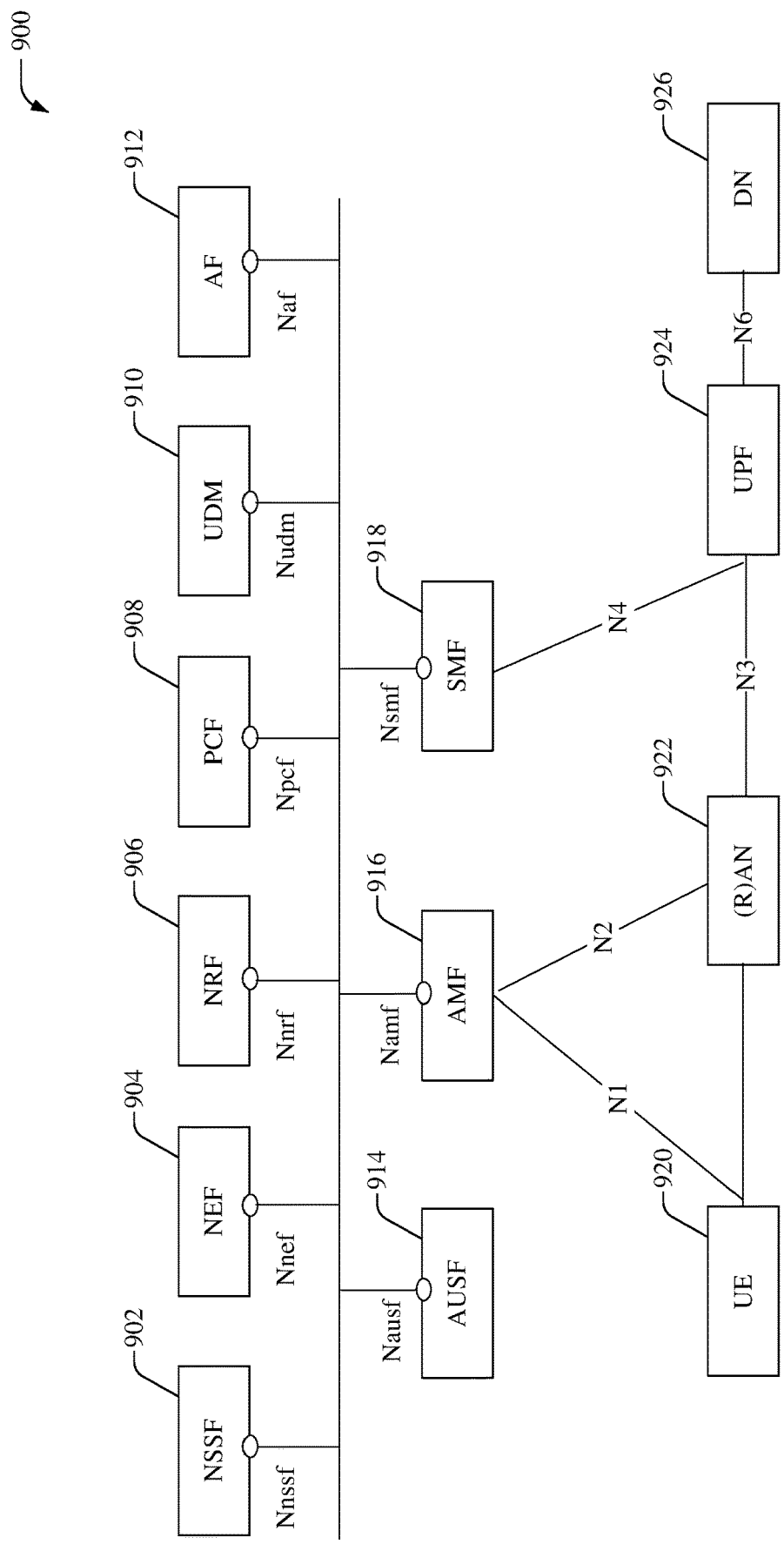
FIG. 9 illustrates an example system that depicts a service-based 5G network architecture.
Figure 10:
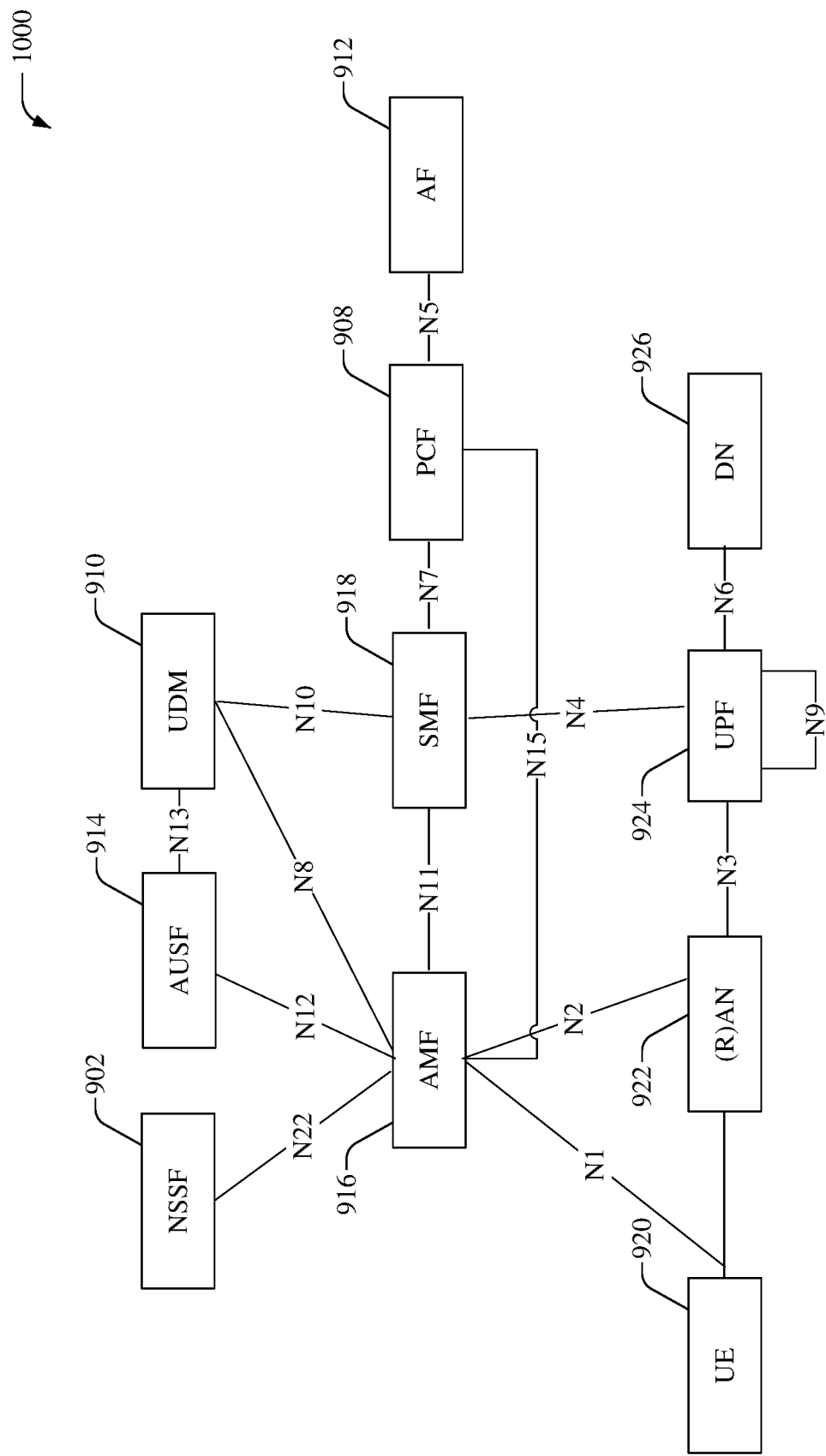
FIG. 10 illustrates an example system that depicts a non-roaming 5G system architecture in reference point representation.

The 5G network architecture is defined as service-based and the interaction between network functions can be represented as shown in FIGS. 9-10. FIG. 9 illustrates an example system 900 that depicts a service-based network architecture, according to an aspect of the subject disclosure. In an aspect, system 900 depicts service-based interfaces being used within the control plane. For example, one network function (e.g. AMF 916) within the control plane can allows other NFs (e.g., NSSF 902, NEF 904, NRF 906, PCF, 908, UDM 910, AF 912, AUSF 914, SMF 918, UPF 924, etc.) that have been authorized, to access its services. This representation also includes point-to-point reference points between the NFs where necessary (e.g., between AMF 916 and UE, 920/(R)AN 922, SMF 918 and UPF 924, (R)AN 922 and UPF 924, UPF 924 and data network (DN) 926).

In an aspect, the AMF 916 can support termination of non-access stratum (NAS) signaling, NAS ciphering and integrity protection, registration management, connection management, mobility management, access authentication and authorization, security context management, etc. The SMF 918 can support session management (e.g., session establishment, modification, release, etc.), UE IP address allocation and management, dynamic host configuration protocol (DHCP) functions, termination of NAS signaling related to session management, downlink (DL) data notification, traffic steering configuration for UPF 924 for proper traffic routing, etc. Further, the UPF 924 can support packet routing and forwarding, packet inspection, QoS handling, can act as external protocol data unit (PDU) session point of interconnect to DN 926, and can be anchor point for intra- and inter-radio access technology (RAT) mobility. A PCF 908 can support unified policy framework, provide policy rules to control plane functions, access subscription information for policy decisions in a unified data repository (UDR), etc. Additionally, the AUSF 914 can comprise an authentication server that authenticates UE 920.

In an aspect, the UDM 910 can support generation of authentication and key agreement (AKA) credentials, user identification handling, access authorization, subscription management, etc. The AF 912 can support application influence on traffic routing, accessing NEF 904, interaction with policy framework for policy control, etc. Further, the NEF 904 can support exposure of capabilities and events, secure provision of information from external application to 3GPP network, translation of internal/external information, etc. Furthermore, the NRF 906 can support service discovery function, maintains NF profile and available NF instances, etc. According to an embodiment, the NSSF 902 can support selecting of the network slice instances to serve the UE 920 that registers via (radio) access network ((R)AN) 922, determining the allowed network slice selection assistance information (NSSAI), determining the AMF (e.g., AMF 916) set to be used to serve the UE, etc.

FIG. 10 illustrates an example system 1000 that depicts a non-roaming 5G system architecture in reference point representation, according to an aspect of the subject disclosure. In one aspect, system 1000 focuses on the interactions between pairs of network functions defined by point-to-point reference point (e.g. N7) between any two network functions. This kind of representation is used when some interaction exists between any two network functions. It is noted that NSSF 902, PCF, 908, UDM 910, AF 912, AUSF 914, AMF 916, SMF 918, UE 920, (R)AN 922, UPF 924, and DN 926, can comprise functionality as more fully described herein, for example, as described above with regard to system 900. It should be noted that although various aspects and embodiments have been described herein in the context of 5G networks, the disclosed aspects are not limited to 5G technology and can be applied to other future wireless communication technologies and their evolutions.

Figure 11:
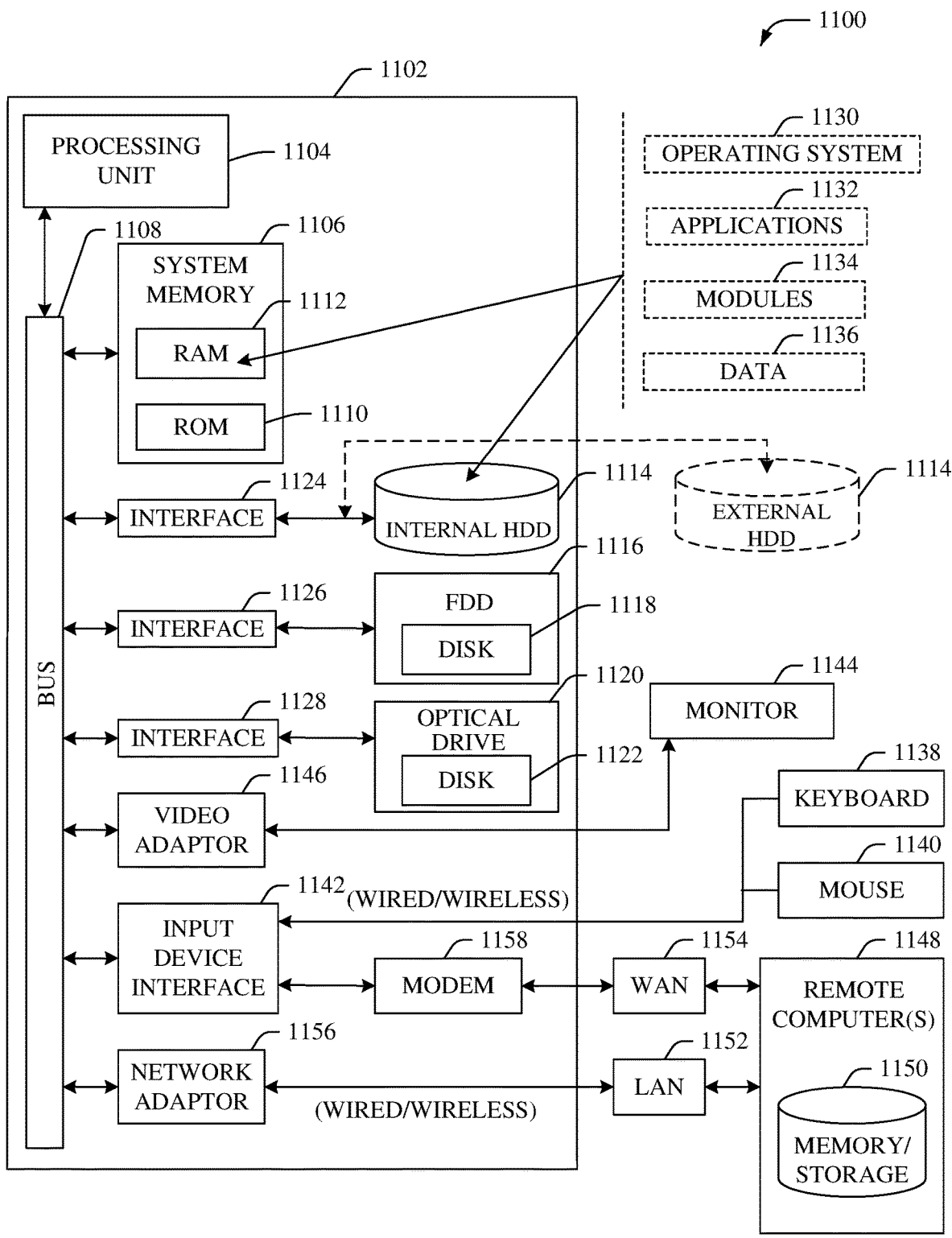
FIG. 11 illustrates a block diagram of a computer operable to execute the disclosed communication architecture.

Referring now to FIG. 11, there is illustrated a block diagram of a computer 1102 operable to execute the disclosed communication architecture. In order to provide additional context for various aspects of the disclosed subject matter, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will note that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media.

With reference again to FIG. 11, the example environment 1100 for implementing various aspects of the specification comprises a computer 1102, the computer 1102 comprising a processing unit 1104, a system memory 1106 and a system bus 1108. As an example, the component(s), network(s), application(s) server(s), equipment, system(s), interface(s), gateway(s), controller(s), node(s), engine(s), entity(ies), function(s), center(s), point(s) and/or device(s) (e.g., container component(s) 102, container orchestration component 104, and BCO component 106, container data store 204, worker machine(s) 206, VNF creation component 302, query generation component 304, validation component 306, cryptographic block generation component 308, blockchain data store 404, network analysis component 502, VNFs 602, VNF1 $604_1$, VNF2 $604_2$, NFVI 608, physical compute 610, physical memory 612, virtualization layer 614, NFV orchestration component 616, OSS and BSS 618, NSSF 902, NEF 904, NRF 906, PCF, 908, UDM 910, AF 912, AUSF 914, AMF 916, SMF 918, UE 920, (R)AN 922, UPF 924, and DN 926, etc.) disclosed herein with respect to systems 100-600 and 900-1000 can each comprise at least a portion of the computer 1102. The system bus 1108 couples system components comprising, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 comprises read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during startup. The RAM 1112 can also comprise a high-speed RAM such as static RAM for caching data.

The computer 1102 further comprises an internal hard disk drive (HDD) 1114, which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1112, comprising an operating system 1130, one or more application programs 1132, other program modules 1134 and program data 1136. All or portions of the operating system, applications, modules, and/or data can also be cached in the RAM 1112. It is noted that the specification can be implemented with various commercially available operating systems or combinations of operating systems.

A user can enter commands and information into the computer 1102 through one or more wired/wireless input devices, e.g., a keyboard 1138 and/or a pointing device, such as a mouse 1140 or a touchscreen or touchpad (not illustrated). These and other input devices are often connected to the processing unit 1104 through an input device interface 1142 that is coupled to the system bus 1108, but can be connected by other interfaces, such as a parallel port, an IEEE 1394 serial port, a game port, a USB port, an infrared (IR) interface, etc. A monitor 1144 or other type of display device is also connected to the system bus 1108 via an interface, such as a video adapter 1146.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically comprises many or all of the elements described relative to the computer 1102, although, for purposes of brevity, only a memory/storage device 1150 is illustrated. The logical connections depicted comprise wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also comprise a wireless access point disposed thereon for communicating with the wireless adapter 1156.

When used in a WAN networking environment, the computer 1102 can comprise a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be noted that the network connections shown are example and other means of establishing a communications link between the computers can be used.

The computer 1102 is operable to communicate with any wireless devices or entities operatively disposed in wireless communication, e.g., desktop and/or portable computer, server, communications satellite, etc. This comprises at least Wi-Fi and Bluetooth™ wireless technologies or other communication technologies. Thus, the communication can be a predefined structure as with a conventional network or simply an ad hoc communication between at least two devices.

Wi-Fi, or Wireless Fidelity networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 12:
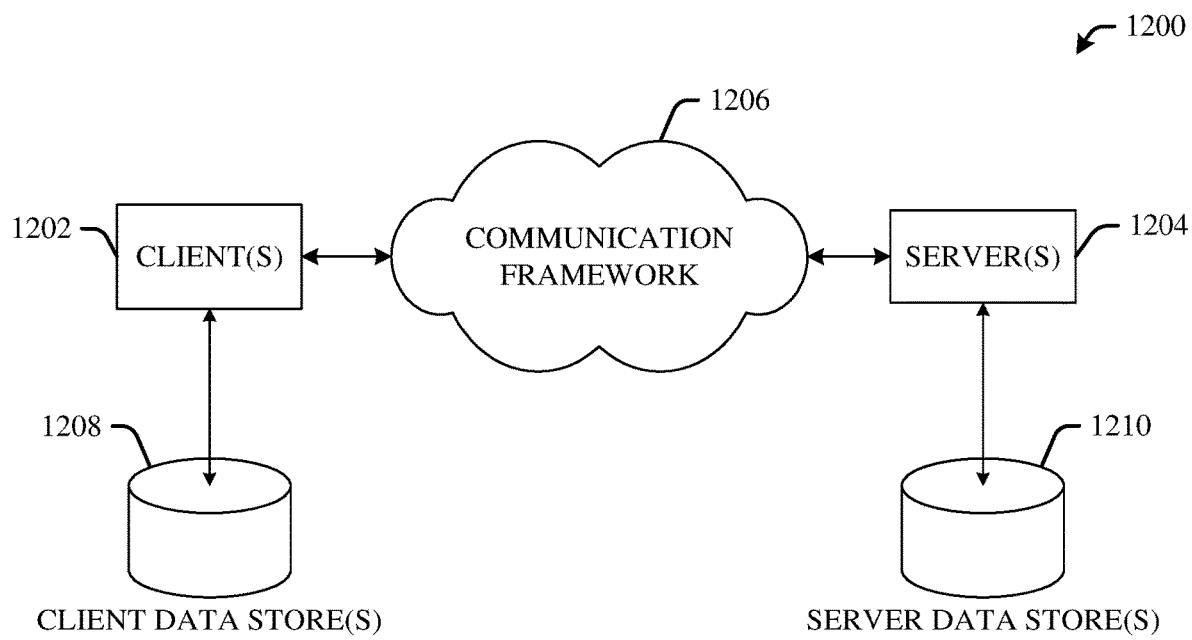
FIG. 12 illustrates a schematic block diagram of a computing environment in accordance with the subject specification.

Referring now to FIG. 12, there is illustrated a schematic block diagram of a computing environment 1200 in accordance with the subject specification. The system 1200 comprises one or more client(s) 1202. The client(s) 1202 can be hardware and/or software (e.g., threads, processes, computing devices).

The system 1200 also comprises one or more server(s) 1204. The server(s) 1204 can also be hardware and/or software (e.g., threads, processes, computing devices). The servers 1204 can house threads to perform transformations by employing the specification, for example. One possible communication between a client 1202 and a server 1204 can be in the form of a data packet adapted to be transmitted between two or more computer processes. The data packet may comprise a cookie and/or associated contextual information, for example. The system 1200 comprises a communication framework 1206 (e.g., a global communication network such as the Internet, cellular network, etc.) that can be employed to facilitate communications between the client(s) 1202 and the server(s) 1204.

Communications can be facilitated via a wired (comprising optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   receiving request data indicative of a request to assign, to a device of a communication network, a container image to facilitate an instantiation of a container, wherein the container image represents a virtual network function associated with a user plane network element of the communication network; and in response to determining that the request data, indicative of the request to assign the container image to the device to facilitate the instantiation of the container, has been authenticated,
  generating cryptographic block data, and
  appending the cryptographic block data to the container to facilitate, based on the cryptographic block data, the instantiation of the container, wherein the cryptographic block data comprises a blockchain ledger that is employable to record activity associated with the container.

2. The system of claim 1, wherein the operations further comprise:
  facilitating an authentication of the request data based on an exchange of public key data and private key data with a control plane network device of the communication network.

3. The system of claim 1, wherein the operations further comprise:
  based the cryptographic block data, validating the container image.

4. The system of claim 1, wherein the operations further comprise:
  facilitating the instantiation of the container to allocate defined resources of the communication network to a specified subscriber entity.

5. The system of claim 1, wherein the operations further comprise:
  in response to determining that the container is to be terminated, storing archived image data that comprises the container image and the cryptographic block data.

6. The system of claim 1, wherein the cryptographic block data comprises a hash value.

7. The system of claim 6, wherein the hash value represents a timestamp associated with the request data.

8. The system of claim 6, wherein the hash value represents identifier data indicative of a user equipment that is served via the user plane network element.

9. The system of claim 6, wherein the hash value represents identifier data indicative of the device.

10. The system of claim 6, wherein the hash value represents identifier data indicative of a requesting entity, from which the request data has been received.

11. The system of claim 1, wherein the operations further comprise:
  analyzing the cryptographic block data; and
  based on a result of the analyzing, detecting malware.

12. A method, comprising:
  determining, by a system comprising a processor, that a container image is to be moved to a device of a communication network to facilitate an instantiation of a container, wherein the container image represents a virtual network function associated with a user plane network element of the communication network; and
  in response to determining that the container image has been validated,
    determining, by the system, cryptographic block data that is to be written to the container, and
    writing, by the system, the cryptographic block data to the container to facilitate the instantiation of the container, wherein the cryptographic block data comprises a blockchain ledger that is employable to record activity associated with the container.

13. The method of claim 12, wherein determining the cryptographic block data comprises determining a hash value indicative of a timestamp associated with a movement of the container image to the device.

14. The method of claim 12, wherein determining the cryptographic block data comprises determining a hash value indicative of identifier data that represents a user equipment that is served via the user plane network element.

15. The method of claim 12, wherein determining the cryptographic block data comprises determining a hash value indicative of identifier data that represents the device.

16. The method of claim 12, wherein the cryptographic block data is first cryptographic block data that comprises a first hash value and wherein the method further comprises:
  in response to determining that the container has been updated, determining, by the system, second cryptographic block data comprising a second hash value that is to be written to the container, wherein the second hash value comprises information associated with an update to the container and comprises the first hash value.

17. A non-transitory machine-readable medium, comprising executable instructions that, when executed by a processor of a control plane device, facilitate performance of operations, comprising:
  determining that a container image is to be moved to a network device of a communication network to facilitate an instantiation of a container that implements a virtual network function associated with a user plane network element of the communication network; and
  in response to determining that the container image has been validated,
    determining cryptographic block data comprising a blockchain ledger that is employable to record activity associated with the container, and
    writing, to the container, the cryptographic block data.

18. The non-transitory machine-readable medium of claim 17, wherein the cryptographic block data is employable to improve a performance of devices of the communication network, wherein the devices comprise the network device.

19. The non-transitory machine-readable medium of claim 17, wherein the cryptographic block data is employable to detect a malicious attack that corresponds to malicious code that has been added to at least one device of the communication network.

20. The non-transitory machine-readable medium of claim 17, wherein the cryptographic block data comprises a hash value representing information associated with the instantiation of the container.

* * * * *